United States Patent [19]

Yasuki et al.

[11] Patent Number: 4,985,757
[45] Date of Patent: Jan. 15, 1991

[54] DIGITAL VIDEO SIGNAL PROCESSING SYSTEM

[75] Inventors: Seijiro Yasuki, Yokohama; Masahiro Yamada, Kawasaki, both of Japan

[73] Assignee: Kabushiki Kaisha Toshiba, Kawasaki, Japan

[21] Appl. No.: 249,697

[22] Filed: Sep. 27, 1988

[30] Foreign Application Priority Data

Sep. 30, 1987 [JP] Japan ................... 62-244013

[51] Int. Cl.$^5$ ........................... H04N 9/46
[52] U.S. Cl. ........................ 358/31; 358/19; 358/11
[58] Field of Search ............ 358/11, 21, 17, 19, 358/140, 31

[56] References Cited

U.S. PATENT DOCUMENTS 4,593,315 6/1986 Willis et al. ............... 358/11
4,612,568 9/1986 den Hollander et al. ..... 358/19
4,680,632 7/1987 Willis et al. ............... 358/11

OTHER PUBLICATIONS

K. Kawai et al.; "IDTV Receiver", IEEE trans, CE vol. CE-33 No. 3 Aug. 1987.
T. Kurita et al., "Non-standard Signal Processing" National Convention Record of the Institute of Television Engineers of Japan pp. 309-310 Jul. 1987.

Primary Examiner—James J. Groody
Assistant Examiner—David E. Harvey
Attorney, Agent, or Firm—Cushman, Darby & Cushman

[57] ABSTRACT

A signal separator performs an inter-line operation on a composite color video signal, thereby separating it into a luminance signal and a chrominance signal. A scan converter converts each of the luminance signal and the chrominance signal into a sequential scan signal on the basis of the double-speed changing of the luminance signal and the chrominance signal. A signal determination circuit determines whether the composite color video signal is a standard signal or a non-standard signal. A first clock producer produces first clocks to be phase-locked to a color subcarrier in accordance with the composite color digital video signal. A second clock producer produces second clocks to be phase-locked to horizontal synchronizing signals in accordance with the composite color digital video signal. A first controller causes the signal separator and the scan converter to operate in accordance with the first clocks when the signal determination circuit determines that the signal is a standard signal. A second controller causes the signal separator to operate in accordance with the first clocks, causes the scan converter to operate in accordance with the second clocks, and converts a sampling rate of each of the luminance signal and the chrominance signal separated by the signal separator in accordance with the first clock into a rate of the second clocks when the signal determination circuit determines that the signal is a non-standard signal.

14 Claims, 6 Drawing Sheets

DIGITAL VIDEO SIGNAL PROCESSING SYSTEM

BACKGROUND OF THE INVENTION

1. Field of the Invention

The present invention generally relates to an improved digital video signal processing system, and more particularly, to a video signal processing system well suited for a television receiver capable of reproducing high-quality color pictures from non-standard signals, such as reproduced signals from video tape recorders (VTR signals), which differ from standard signals.

2. Description of the Related Art

Owing to recent advances in digital techniques, research and development have been made for improvements in the quality of television pictures by utilizing image memories. An approach to improving the quality of television pictures involves luminance/chrominance signal (Y/C) separation and non-interlace conversion.

A technique is known wherein the Y/C separation in which a predetermined number of field memories are shared and the non-interlace conversion are simultaneously executed. Television receivers adopting such a technique can be of a smaller scale than television receivers designed to separately perform the Y/C separation and the non-interlace conversion.

However, when the television receivers, adapted for simultaneous execution of the Y/C separation and the non-interlace conversion, receive non-standard signals containing jitter in their synchronizing signals from video tape recorders (VTRs), the picture quality is considerably degraded. This is because the jitter causes the one-horizontal-line time of the VTR signals to differ so that it does not always equal an integral multiple of the color subcarrier frequency fsc.

SUMMARY OF THE INVENTION

It is accordingly an object of the present invention to provide a new and improved digital video signal processing system capable of processing any non-standard signal so that high-quality pictures may be reproduced.

It is another object of the present invention to provide a digital video signal processing circuit which can process non-standard signals so as to permit reproduction of high-quality color pictures.

It is still another object of the present invention to provide a digital video signal processing method which can accommodate standard signals and non-standard signals.

According to the present invention therein provided a digital color video signal processing circuit comprising:

signal separating means connected to receive a composite color video signal in digital form for performing an inter-line operation on the composite color video signal to separate it into a luminance signal and a chrominance signal;

scan converting means coupled to said signal separating means for converting each of the luminance signal and the chrominance signal to a sequential scan signal by means of double-speed changing the luminance signal and the chrominance signal;

signal determination means for determining whether the composite color digital video signal is a standard signal or a non-standard signal;

first clock producing means for producing first clocks phase-locked to a color subcarrier in accordance with the composite color digital video signal;

second clock producing means for producing second clocks phase-locked to horizontal synchronizing signals in accordance with the composite color digital video signal;

first control means for causing said signal separating means and said scan converting means to operate in accordance with the first clocks produced by said first clock producing means when said signal determination means determines that the composite color digital video signal is a standard signal; and second control means for causing said signal separating means to operate in accordance with the first clocks produced by said first clock producing means, causing said scan converting means to operate in accordance with the second clocks produced by said second clock producing means, and converting a sampling rate of each of the luminance signal and the chrominance signal separated by said signal separating means to a rate of the second clocks when said signal determination means determines that the composite color digital video signal is a non-standard signal.

BRIEF DESCRIPTION OF THE DRAWINGS

Other objects and features of the present invention can be understood through the following embodiment by reference to the accompanying drawings in which.

DETAILED DESCRIPTION OF THE PREFERRED EMBODIMENTS

For a better understanding of the present invention, the above-mentioned conventional technique and the problems associated therewith will first be described.

Figure 3:
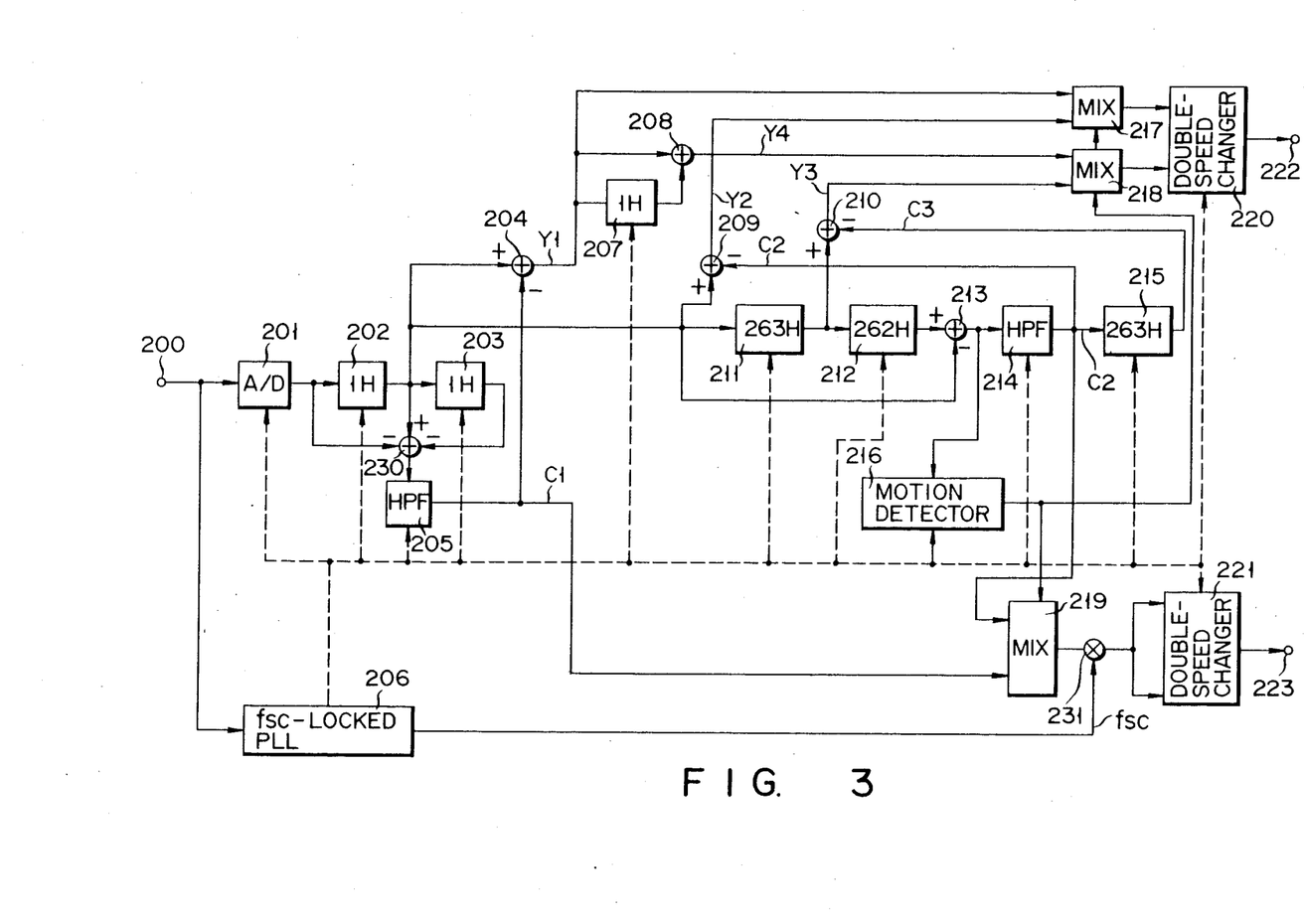
FIG. 3 is a block diagram of a prior art digital video signal processing system.

Referring to FIG. 3, which shows a digital video signal processing circuit based on the conventional technique, a composite color video signal is applied to an input terminal 200. The composite video signal is converted to a digital signal by an analog-to-digital (A/D) converter 201 and then applied to a comb filter for separation into a luminance signal Y and a chrominance signal C by utilizing the phase reversal of the chrominance signal contained on the upper and lower lines of the composite video signal. The comb filter is comprised of line memories 202, 203, an adder 230, a highpass filter (HPF) 205 and an adder 204. The composite video signal is converted into the digital signal in A/D converter 201 to be in synchronism with a clock signal provided by a phase locked loop (PLL) 206 adapted to be locked to a color subcarrier frequency fsc and having a frequency which is an integral multiple of fsc, for example, 4×fsc. The digital signal is applied to line memory 202 and adder 230. An output of line memory 202 is applied to adder 230 and line memory 203. An output of line memory 203 is also applied to adder 230. Adder 230 subtracts, from a to-be-separated pixel, the pixels before and after one line delay has occurred in the to-be-separated pixel. An output of adder 230 is applied to HPF 205 with the result that the chrominance signal C is separated therefrom. This signal is referred to as the C1 signal hereinafter. The C1 signal is subtracted from the output of line memory 202 by an adder 204 to separate the luminance signal Y therefrom. This signal is referred to as the Y1 signal hereinafter.

An output signal of line memory 202 is applied to a field memory 211 and adders 209 and 213. Field memory 211 has a capacity of 263 lines, and its output is coupled to a field memory 212 and an adder 210. Field memory 212 has a capacity of 262 lines, and its output is coupled to adder 213. Adder 213 calculates a difference between successive frames to separate the chrominance signal by utilizing the fact that the phase of the chrominance signal is reversed on successive frames. The separated chrominance signal is entered into a highpass filter (HPF) 214. The signal from HPF 214 is called C2, and is applied to adder 209. In adder 209, the C2 signal is subtracted from the output signal of line memory 202 to separate a Y signal therefrom which is referred to as the Y2 signal.

On the other hand, the C2 signal is applied to a field memory 215 to undergo another delay of 263 lines. An output signal (referred to as the C3 signal hereinafter) of field memory 215 is applied to adder 210. Adder 210 subtracts the C3 signal from the output of field memory 211 to separate a Y signal therefrom which is referred to as the Y3 signal hereinafter.

The Y1 signal and the Y2 signal are applied to a mixer 217. The Y1 signal and a signal one-line delayed from the Y1 signal provided by line memory 207 are added together in adder 208 to yield a signal which is referred to as the Y4 signal hereinafter. The Y3 signal and the Y4 signal are applied to a mixer 218. The C1 signal and the C2 signal are input to a mixer 219. Mixers 217, 218 and 219 have their mixing ratios, i.e., Y1 to Y2; Y3 to Y4; and C1 to C2 variably controlled by a motion detector 216. Output signals of mixers 217 and 218 are applied to a double-speed changer 220 for sequential scanning, and an output signal of double-speed changer 220 is received from output terminal 222. On the other hand, an output signal of mixer 219 is demodulated by a multiplier 221 and then applied to a double-speed changer 221 for sequential scanning. An output signal of double-speed changer 221 is received from output terminal 223.

Motion detector 216 detects parts in motion on the basis of the inter-frame difference signal at the output of adder 213. In the case of much motion, motion detector 216 causes mixers 217, 218 and 219 to increase the proportions of Y1, Y4 and C1, respectively. Conversely, in the case of only a little motion, motion detector 216 causes mixers 217, 218 and 219 to increase the proportions of Y2, Y3 and C2, respectively.

The above operations are performed by means of a clock signal whose frequency is an integral multiple of the color subcarrier frequency fsc. The clock signal is generated by PLL 206 to be adapted to lock to the color subcarrier frequency fsc and to be applied to various circuit portions.

Figure 4:
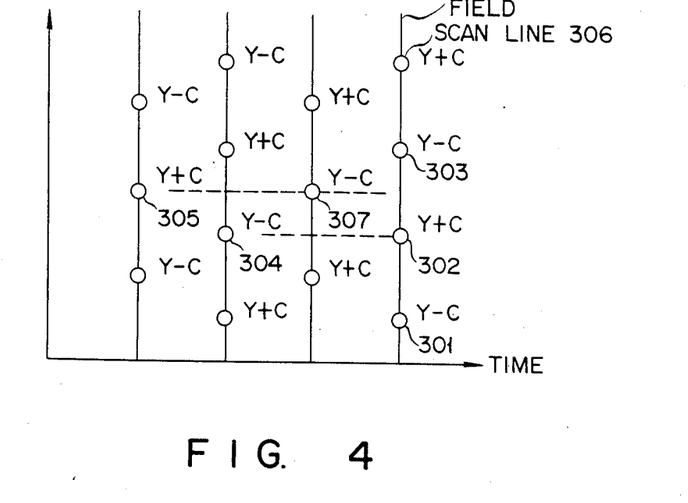
FIGS. 4 and 5 are diagrams used for explaining the operation of the system of FIG. 3.

The above operations will be described below with reference to FIG. 4, which shows the fields and scan lines of the video signals with respect to a time reference. In the figure, assuming that the output signal of line memory 202 is on a scan line 302, the above Y1 and C1 signals can be separated by using scan lines 303, 302 and 301. Further, the Y4 signal is the sum of signals separated by scan lines 306, 303, and 302, and signals separated by scan lines 303, 302, and 301. These processes are performed only within a field.

On the other hand, signals Y2 and C2 are separated by using scan lines 302 and 304, respectively, and signals Y3 and C3 are separated by using scan lines 307 and 305. For still pictures, images are composed of signals obtained by inter-frame processing the Y2 and Y3 signals. For motion pictures, images are composed of signals obtained by processing Y4 and Y1 signals within one field.

Figure 5:
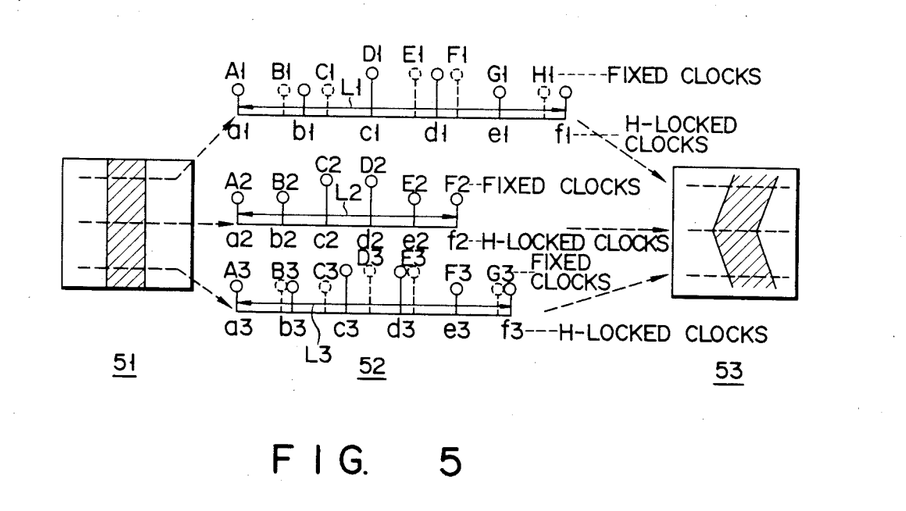

Next, the problems with such a signal processing system will be described with reference to FIG. 5. When a longitudinal stripe designated at 51 in FIG. 5 is reproduced by signals from a VTR, the length of one-horizontal-line scanning period with no jitter will change at the middle, upper, and lower portions of a screen, e.g. L1, L2, and L3, as designated at 52 in FIG. 5. In this case, since the chrominance signal is multiplexed by a precise carrier from APC and AFC circuits in a VTR, the Y/C separation is performed by means of a fixed frequency clock signal.

As in the processing circuit of FIG. 3, when the VTR signals are sampled by a clock signal of a fixed frequency which is an integral multiple of fsc, and the VTR signals are non-interlace converted by the use of memories, various portions of the screen will not be able to equally obtain the same number of samples on a horizontal line thereof, as in the case of A1—H1, A2—F2 and A3—G3. As a result, the image of an inherently longitudinal stripe will be deformed as shown by 53 in FIG. 5.

The present invention is featured in the digital video signal processing system including the luminance/-chrominance signal separation section and the sequential scan conversion section, wherein, the switching of clocks is performed in such a way that the sequential scan conversion for the non-standard signals as reproduced from VTRs is performed by means of clocks produced by a PLL following horizontal synchronizing signals and by means of clocks produced by a PLL locked to the color subcarrier for the standard signals.

Thus, according to the present invention, since the clocks controlling the operation of the sequential scan conversion section are switched from the color-subcarrier-locked clocks to the horizontal-synchronizing-signal-locked clocks upon reception of the non-standard signals, the non-standard signals reproduced from VTRs can be processed so as to permit the reproduction of high-quality pictures which have not been effected by jittering movement.

Figure 1A:
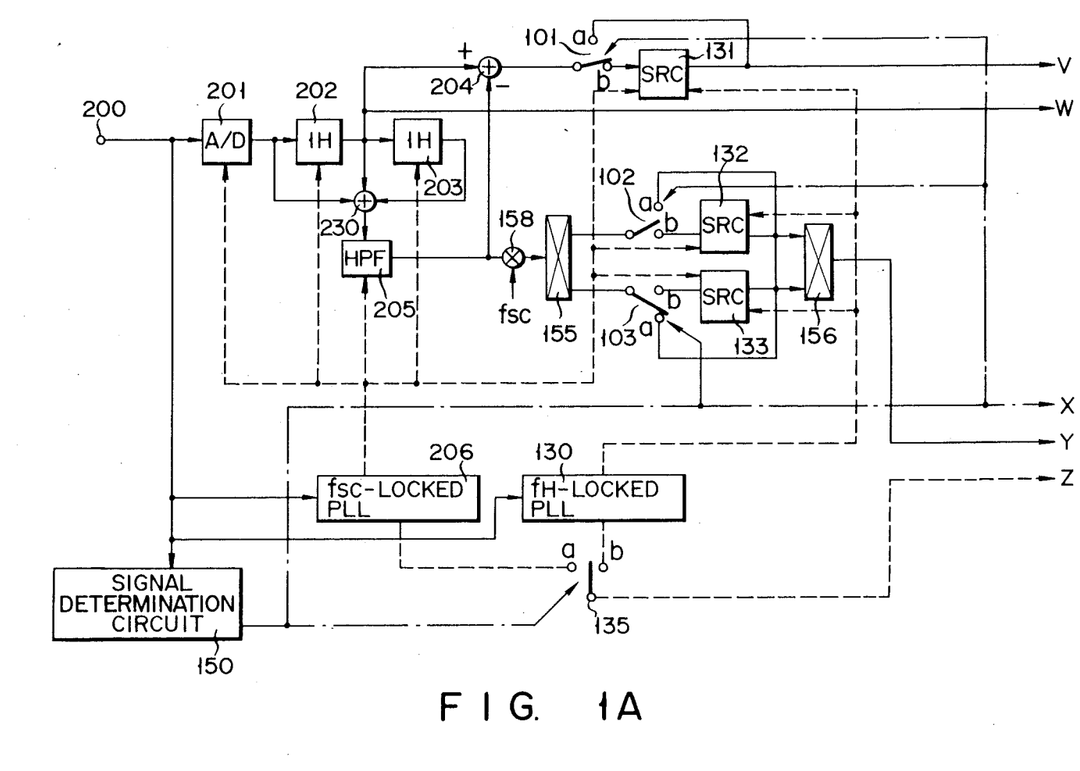
FIGS. 1A and 1B show a block diagram of a digital video signal processing system embodying the present invention.
Figure 1B:
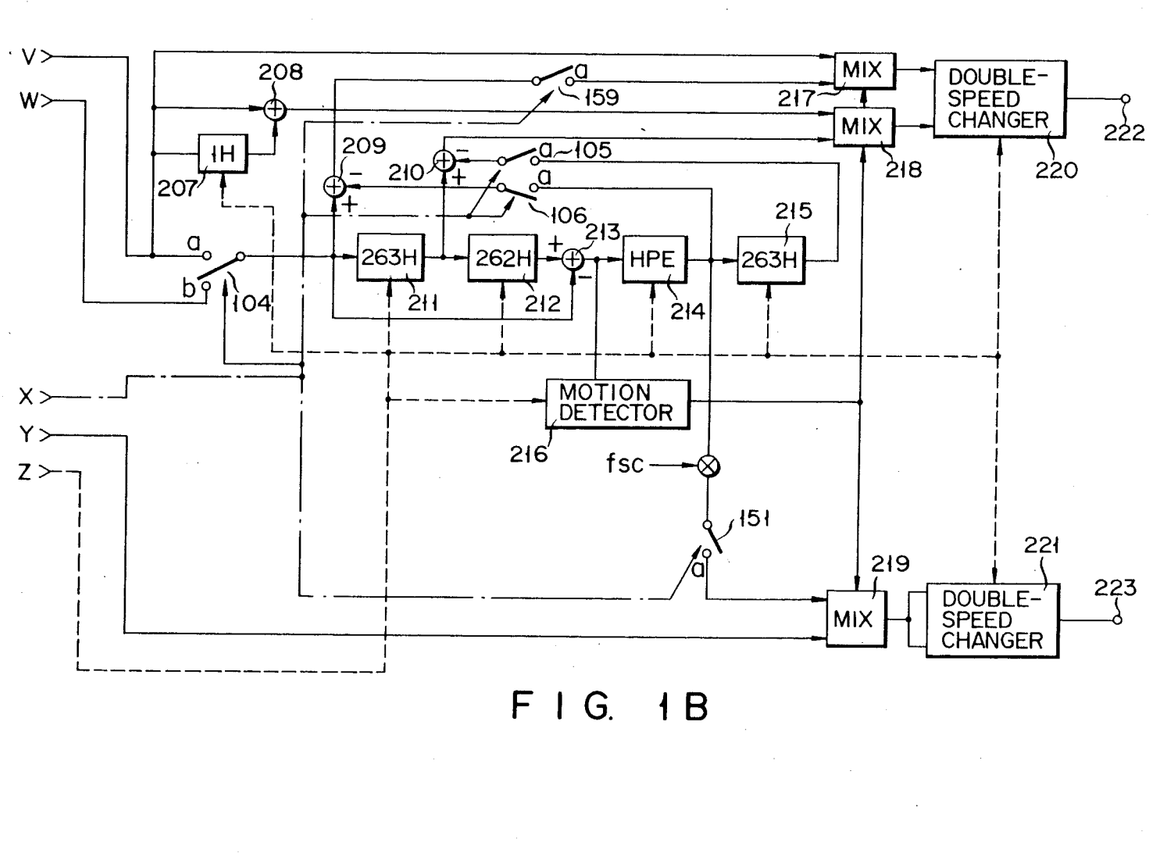

A digital video signal processing circuit embodying the present invention will be described in detail hereinafter. FIGS. 1A and 1B show an embodiment of the present invention. In this figure, the portions having the same functions as those in FIG. 3 are denoted by like reference numerals and the description thereof are excluded.

The embodiment is characterized by a fH-locked PLL 130 adapted to lock to horizontal sync signals, switches 101–106, 151, and 159, a signal determination circuit 150, and sampling rate converters 131–133. Hereinafter, the description will center on the characterizing portions of the present application.

When an input video signal is a standard signal such as a television broadcast signal, switches 101–106, 135, 151, and 159 are thrown to side a, and the whole circuit is operated by means of the fsc-locked clocks At that time, the operation of the circuit is the same as that of the conventional process circuit shown in FIG. 3.

When the input signal is a non-standard type signal, as provided by a VTR, in which the horizontal line period H always jitters, switch 135 is thrown to side b by signal determination circuit 150 with the result that the circuit portions on the right-hand side of sampling rate converters 131, 132, 133 are operated by means of the system clocks synchronized with horizontal sync signals.

Switches 101–104 are thrown to side b, while switches 105, 106, 151, and 159 remain open. Only the circuit portions in the process circuit of FIG. 1 which perform the signal processing at the time switches 101–104 are thrown to side b are shown in FIG. 2A.

Hereinafter, a case will be described wherein an input video signal is a non-standard signal.

Figure 2A:
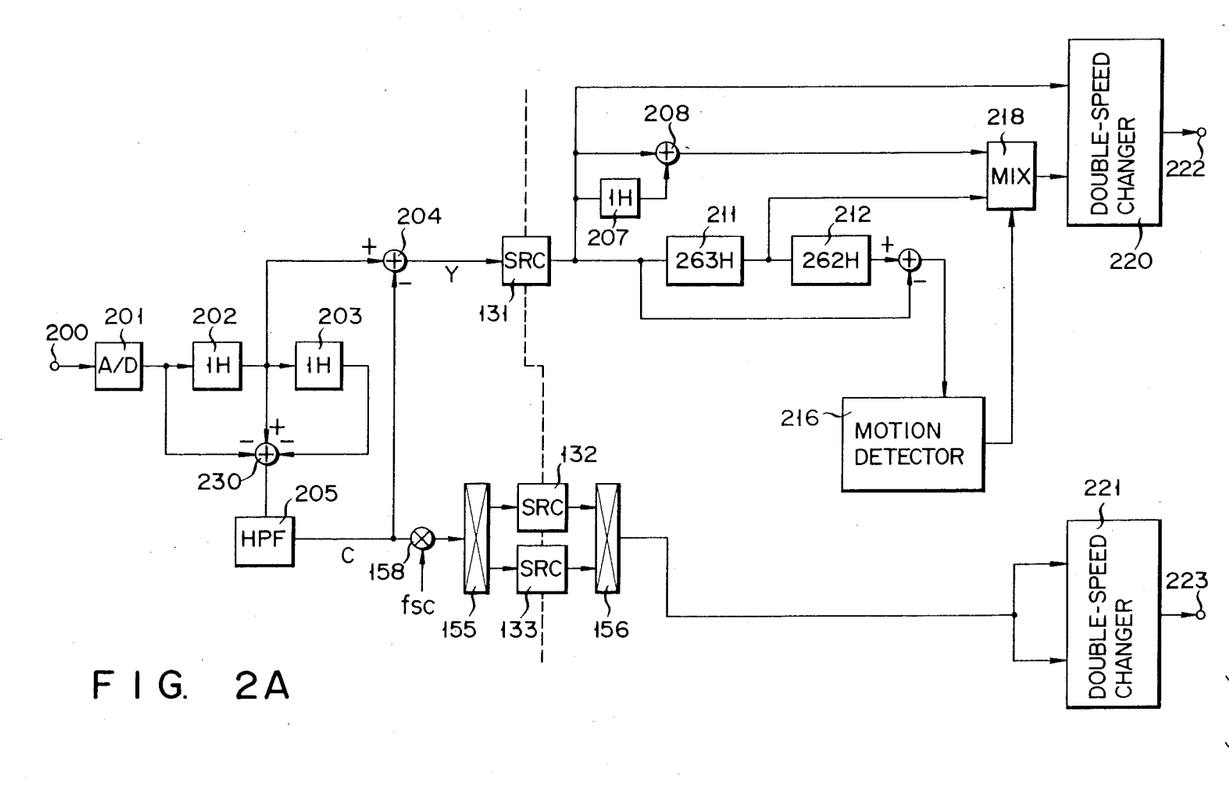
FIG. 2A is a block diagram of the circuit portion of FIG. 1 and is particularly used for signal processing.

In FIG. 2A, the circuit portions on the left-hand side of a broken line operate in accordance with the fsc-locked clocks, while the circuit portions on the right-hand side operate in accordance with the fH-locked clocks. The C signal is output from HPF 205, and the Y signal is output from adder 204. The Y signal is applied to sampling rate changer 131. The sampling rate changer is arranged to change the sampling rate of digital data by performing D/A conversion by means of input clocks and performing subsequent A/D conversion by means of output clocks.

The output signal of HPF 205 is demodulated by demodulator 158 and then separated into the I and Q signals, for example, by selector 155. The demodulated I and Q signals are applied to sampling rate changer 132 and 133, respectively.

Sampling rate changers 131–133 convert data whose clock rate is an integral multiple of fsc into data of an fH-locked clock rate. The output signal of sampling rate changer 131 is applied to double-speed changer 220, adder 208 and line memory 207. Adder 208 calculates the sum of successive two lines to produce an interpolation signal for motion pictures. The output signal of sampling rate changer 131 is subjected to a delay of 263 lines by field memory 211 to produce an interpolation signal for still pictures. The output signals of field memory 211 and adder 208 are mixed in a mixing ratio controlled by motion detector 216 and then applied to double-speed changer 220. The output signals of sampling rate changers 132 and 133 are time-division multiplexed and then applied to double-speed changer 221. It should be noted that mixers 217 and 219 are excluded from FIG. 2 since they produce only motion picture signals upon receiving non-standard signals.

During the above operation, field memories 211, 212 and line memory 207 operate in accordance with the fH-locked clocks. Therefore, the non-standard signals can be processed to permit the reproduction of high-quality pictures without causing distortions in reproduced images. This is because various portions of a screen equally have the same number of samples on a horizontal line thereof in accordance with the H-locked clocks as shown by a1—f1, a2—f2 and a3—f3 by 52 in FIG. 5.

Figure 2B:
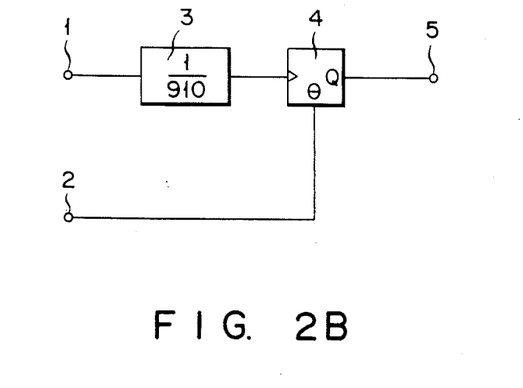
FIG. 2B shows a practical arrangement of a signal decision circuit in FIG. 1.

FIG. 2B shows a practical arrangement of signal decision circuit 150. An input terminal 1 is supplied with 4fsc clocks from fsc-locked PLL 2, for example, while an input terminal 2 is connected to receive a signal Hsync synchronized with horizontal synchronizing signals from fH-locked PLL 130, for example. The 4 fsc clocks are applied to a frequency divider 3 to have their frequency divided by 910 and then applied to a clock input of a D flip-flop circuit 4. As a result, D flip-flop circuit 4 latches the Hsync signal applied to its clock input and issues a latched output to an output terminal 5. The latched output signal serves to determine whether a video signal input to terminal 200 is a standard signal or a non-standard signal.

The operation employed for determining the type of signal input will be described with reference to FIG. 2C. In this figure, reference numeral 21 denotes the 4 fsc clocks, and 22 numeral denotes the signal divided-by-910. When the input video signal is a standard signal, the signal Hsync applied to input terminal 2 stands in a synchronous relationship with the signal 22 divided-by-910 as shown by 23 in FIG. 2C. When such a synchronous relationship exists as described above, a latched signal or an output signal from output terminal 5 retains a remains low value frequency.

Figure 2C:
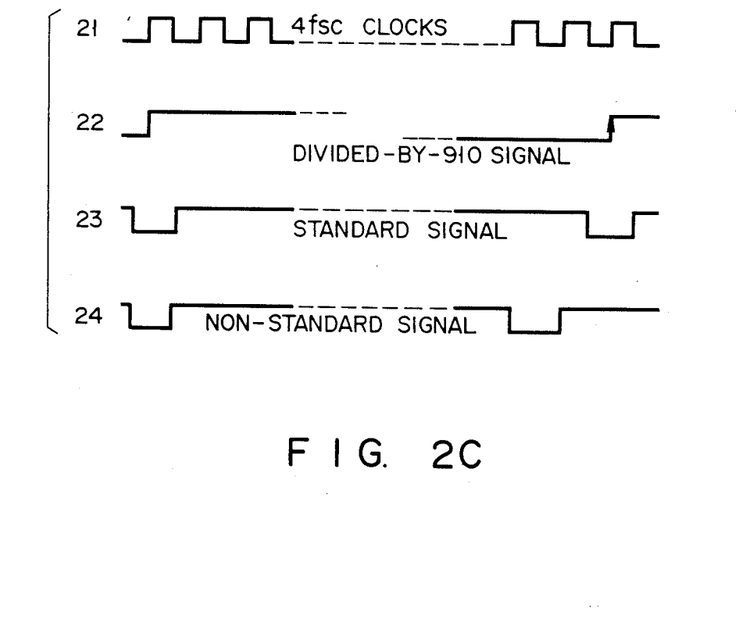
FIG. 2C is a timing diagram of the determination circuit of FIG. 2B.

On the other hand, when the input video signal is a non-standard type, the Hsync signal does not synchronously relate to the signal 22 which has been divided-by-910 as shown by 24 in FIG. 2C. Under the circumstances that the input video signal is a non-standard type, the latched output signal from output terminal 5 always remains high.

Namely, signal decision circuit 150 of FIG. 2B produces a low-level output signal when an input video signal is a standard signal and produces a high-level output signal when the input signal is a non-standard signal.

As described above, the digital video signal processing system of this invention allows high-quality non-interlace pictures to be reproduced from non-standard signals such as VTR signals as well as allows pictures having the same quality as conventional images to be reproduced from standard signals.

What is claimed is:

1. A digital color video signal processing circuit for processing a composite color digital video signal, comprising:

first clock producing means for producing first clocks which are phase-locked to a color subcarrier in accordance with the composite color digital video signal;

second clock producing means for producing second clocks which are phase-locked to horizontal synchronizing signals in accordance with the composite color digital video signal;

signal separating means connected to receive a composite color video signal in digital form for performing an inter-line operation on the composite color digital video signal to separate it into a luminance signal and a chrominance signal, said signal separating means operating in synchronism with said first clocks;

scan converting means coupled to said signal separating means for converting each of the luminance signal and the chrominance signal into a sequential scan signal by means of double speed changing each of the luminance signal and the chrominance signal, said scan converting means operating in synchronism with a predetermined clock source;

signal determination means for determining whether the composite color digital video signal is a standard signal or a non-standard signal;

first clock source control means for controlling said predetermined clock source to be said first clocks, to cause said signal separating means and said scan converting means to operate in accordance with the first clocks produced by said first clock producing means, when said signal determination means determines that the composite color digital video signal is a standard signal; and second clock source control means for controlling said predetermined clock source to be said second clocks, to cause said signal separating means to operate in accordance with the first clocks produced by said first clock producing means, and to cause said scan converting means to operate in accordance with the second clocks produced by said second clock producing means, and for converting a sampling rate of each of the luminance signal and the chrominance signal separated by said signal separating means to a rate of the second clocks when said signal determination means determines that the composite color digital video signal is a non-standard signal.

2. A digital color video signal processing circuit according to claim 1, further comprising A/D converting means for converting an analog composite color video signal into the digital composite color video signal.

3. A digital color video signal processing circuit according to claim 2, wherein said first clock producing means includes a phase-locked circuit connected to receive the analog composite color video signal for locking to the color subcarrier.

4. A digital color video signal processing circuit according to claim 2, wherein said second clock producing means includes a phase-locked circuit connected to receive the analog composite color video signal for locking to the horizontal synchronizing signals.

5. A digital color video signal processing circuit comprising:

signal separating means connected to receive a composite color video signal in digital form for performing an inter-line operation on the composite color digital video signal to separate it into a luminance signal and a chrominance signal;

scan converting means coupled to said signal separating means for converting each of the luminance signal and the chrominance signal into a sequential scan signal by means of double-speed changing each of the luminance signal and the chrominance signal;

signal determination means for determining whether the composite digital video signal is a standard signal or a non-standard signal;

first clock producing means for producing first clocks to be phase-locked to a color subcarrier in accordance with the composite color digital video signal;

second clock producing means for producing second clocks to be phase-locked to horizontal synchronization signals in accordance with the composite color digital video signal;

first control means for causing said signal separating means and said scan converting means to operate in accordance with the first clocks produced by said first clock producing means, when said signal determination means determines that the composite color digital video signal is a standard signal, and second control means for causing said signal separating means to operate in accordance with the first clocks produced by said first clock producing means, causing said scan converting means to operate in accordance with the second clocks produced by said second clock producing means, and converting a sampling rate of each of the luminance signal and the chrominance signals by said signal separating means to a rate of the second clocks separated when said signal determination means determines that the composite color digital video signal is a non-standard signal, wherein said signal decision circuit includes a frequency divider for dividing the frequency of the first clocks produced by said first clock producing means, and latching the second clocks produced by said second clock producing means by utilizing a frequency-divided output of said frequency divider; and wherein said signal determination means determines that the composite color digital video signal is a standard signal when the frequency divided output of said frequency divider and the second clocks stand in a predetermined synchronous relationship, and determine that the composite color digital video signal is a non-standard signal when the frequency-divided output of said frequency divider and the second clocks have an asynchronous relationship.

6. A digital color video signal processing circuit according to claim 1, wherein, when the standard signal is a television broadcast signal, the non-standard signal includes signals other than the television broadcast signal.

7. A digital color video signal processing circuit according to claim 6, wherein the other signals include a VTR signal.

8. A digital color video signal processing circuit according to claim 1, wherein said second clock source control means includes a predetermined number of sampling rate converting circuits, each for converting each of the sampling rates of the luminance signal and the chrominance signal from a rate of the first clocks to a rate of the second clocks, and said first clock source control means includes switching means for bypassing each of said sampling rate converting circuits to bypass said converting circuits.

9. A method of processing a digital video signal for use in a television receiver which includes luminance/chrominance signal separating means for separating a received composite color digital video signal into a luminance signal and a chrominance signal on the basis of an inter-line operation; and sequential scan converting means for converting, by double-speed changing, each of the luminance signal and the chrominance signal output from said luminance/chrominance separating means into a sequential scan signal, said method comprising the steps of:

causing said luminance/chrominance separating means and said sequential scan converting means to operate in accordance with clocks phase-locked to a color subcarrier when synchronizing signals of the received composite color television signal are standard signals; and causing said luminance/chrominance separating means to operate in accordance with clocks phase-locked to the color subcarrier and causing said sequential scan converting means to operate in accordance with clocks phase-locked to horizontal synchronizing signals when the synchronizing signals of the received composite color television signal are non-standard signals.

10. A digital color video signal processing circuit comprising:

an input means, for receiving an input analog composite video signal which can be a standard or non-standard type;

first clock producing means, for producing a first clock phase-locked to a color subcarrier included in the analog composite video signal, upon receiving the analog composite video signal from the input means;

second clock producing means, for producing a second clock phase-locked to a horizontal synchronizing signal included in the analog composite video signal, upon receiving the analog composite video signal from the input means;

a signal determination means, determining whether said analog composite video signal is standard or non-standard, upon receiving the analog composite video from the input means;

an A/D converting means, for converting the analog composite video signal from the input into a digital composite video signal in accordance with the first clock from the first clock producing means;

a first signal separating means, for separating the digital composite video signal from the A/D converting means into an inter-line luminance signal and a chrominance signal, by performing an inter-line operation in accordance with the first clock from the first clock producing means;

a sample rate converting means, for selectively converting a sample rate of each of the data signals, the luminance signal and chrominance signal, separated by the signal separating means, into a rate in accordance with the second clock from the second clock producing means;

a first switch means, for causing the luminance signal and chrominance signal to bypass the sample rate converting means when a determination result from the signal determining means is standard, and for supplying the luminance signal and chrominance signal to the sample rate converting means when the determination result is non-standard;

a second switch means, for outputting the first clock from the first clock generating means when the determination result by the signal determining means is standard, and for outputting the second clock from the second clock generating means when the determination result is non-standard;

a second signal separating means, for separating the digital composite video signal from the A/D converting means into an inter-frame operation signal and chrominance signal, by performing an inter-frame operation in accordance with an output signal from the second switch means;

mixing means, for selectively mixing the data of the luminance signal and the data of the chrominance signal from the first signal separating means, from the second signal separating means;

a third switch means, for controlling the mixing means in response to whether the determination result from the predetermined signal determination means is standard or is non-standard; and a scan converting means, for converting the luminance signal data and the chrominance signal data, output from the mixing means, successively into a sequential scan signal data by performing double-speed conversion.

11. A digital color video signal processing circuit according to claim 10, wherein said input means includes A/D converting means for converting a non-standard composite color video signal of an analog type into the non-standard composite color digital video signal.

12. A digital color video signal processing circuit according to claim 11, wherein said first clock producing means includes a phase-locked circuit connected to receive the composite color analog video signal for locking to the color subcarrier.

13. A digital color video signal processing circuit according to claim 10, wherein said second clock producing means includes a phase-locked circuit connected to receive the analog composite color video signal for locking to the horizontal synchronizing signals.

14. A digital color video signal processing circuit according to claim 10, wherein the non-standard signal includes a VTR signal.

* * * * *